(12) United States Patent
Kim

(10) Patent No.: US 12,486,809 B2
(45) Date of Patent: Dec. 2, 2025

(54) DUAL FUEL SYSTEM AND OPERATING STRATEGY METERING FUEL VIA VARIED FUEL PUMP OUTPUT

(71) Applicant: Caterpillar Inc., Peoria, IL (US)

(72) Inventor: Hoisan Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/627,492

(22) Filed: Apr. 5, 2024

(65) Prior Publication Data

US 2025/0314211 A1 Oct. 9, 2025

(51) Int. Cl.
*F02D 19/06* (2006.01)
*F02D 19/08* (2006.01)

(52) U.S. Cl.
CPC ..... *F02D 19/0694* (2013.01); *F02D 19/0649* (2013.01); *F02D 19/0681* (2013.01); *F02D 19/0684* (2013.01); *F02D 19/0689* (2013.01); *F02D 19/08* (2013.01)

(58) Field of Classification Search
CPC ............ F02D 19/0694; F02D 19/0649; F02D 19/0681; F02D 19/0684; F02D 19/0689; F02D 19/08
See application file for complete search history.

(56) References Cited

U.S. PATENT DOCUMENTS

| | | |
|---|---|---|
| 4,416,229 A | 11/1983 | Wood |
| 6,761,325 B2 | 7/2004 | Baker et al. |
| 8,322,325 B2 * | 12/2012 | Rogak .................. F02D 19/081 123/304 |
| 8,733,326 B2 | 5/2014 | Kim et al. |
| 11,384,721 B1 * | 7/2022 | Schroeder ............ F02M 57/023 |
| 11,773,792 B1 | 10/2023 | Coldren et al. |
| 11,815,055 B1 * | 11/2023 | Coldren ................ F02M 51/06 |
| 12,326,127 B2 * | 6/2025 | Coldren ................ F02D 19/081 |

(Continued)

FOREIGN PATENT DOCUMENTS

| | | |
|---|---|---|
| CN | 208950752 U | 6/2019 |
| CN | 115163364 A | 10/2022 |
| CN | 113339153 B | 6/2023 |

(Continued)

OTHER PUBLICATIONS

Written Opinion and International Search Report for Int'l. Patent Appln. No. PCT/US2025/020357, mailed Jun. 18, 2025 (15 pgs).

*Primary Examiner* — Gonzalo Laguarda
(74) *Attorney, Agent, or Firm* — Brannon Sowers & Cracraft PC

(57) ABSTRACT

A dual fuel system includes a first fuel supply of a first fuel, a second fuel supply of a second fuel, and a variable-output fuel pump. A fuel injector in the dual fuel system includes a combined-fuel outlet passage, a nozzle check movable to open and close the combined-fuel outlet passage to nozzle outlets, and a check valve positioned at least partially in a first fuel passage connected to the first fuel supply by way of the variable-output fuel pump. The first fuel may include a compression-ignition fuel and the second fuel may include an alcohol fuel. Varying output of the fuel pump during an off-cycle of a cam actuating a plunger in the fuel injector meters the first fuel to the fuel injector for forming a fuel charge for injection. Related apparatus and methodology is also disclosed.

20 Claims, 2 Drawing Sheets

(56) References Cited

U.S. PATENT DOCUMENTS

2007/0295311 A1\* 12/2007 McCue ................. F02M 59/20
                                                                                     123/482
2021/0207554 A1    7/2021 Marrack

FOREIGN PATENT DOCUMENTS

| CN | 114439658 B | 6/2023 |
|---|---|---|
| JP | 06159182 A | 6/1994 |
| JP | H07174056 A | 7/1995 |
| WO | 2013086427 A1 | 6/2013 |

\* cited by examiner

DUAL FUEL SYSTEM AND OPERATING STRATEGY METERING FUEL VIA VARIED FUEL PUMP OUTPUT

TECHNICAL FIELD

The present disclosure relates generally to a dual fuel system, and more particularly to metering a fuel for injection by way of a variable-output fuel pump.

BACKGROUND

Dual fuel engine systems have been known for decades. While traditional engine systems typically utilize a single fuel type such as diesel, gasoline, or natural gas, in a dual fuel engine system two different fuels each having different desirable properties are typically combusted together in an engine cylinder.

In one known strategy, a relatively small pilot charge of a compression-ignition fuel such as diesel is used to ignite a relatively larger main charge of a gaseous fuel such as natural gas. The diesel fuel is relatively easily ignited by way of an increased temperature and pressure in a cylinder, with the ignition of the diesel fuel triggering ignition of the gaseous fuel.

More recently, engineers have proposed dual liquid fuel strategies employing a leading fuel and a trailing fuel, both in a liquid form and injected as a single fuel charge. U.S. Pat. No. 11,384,721 B1 proposes a strategy that may operate by injecting a leading diesel fuel followed by a trailing alcohol fuel from the same passage into an engine cylinder for combustion. While the '721 patent undoubtedly has practical applications, there is always room for improvement and development of alternative strategies.

SUMMARY

In one aspect, a dual fuel system includes a first fuel supply of a first fuel, and a second fuel supply of a second fuel. The dual fuel system further includes a fuel injector including a nozzle having formed therein a plurality of nozzle outlets, a first fuel passage extending from a first fuel inlet for the first fuel, and a second fuel passage extending from a second fuel inlet for the second fuel. The fuel injector further has formed therein a combined fuel outlet passage, and includes a nozzle check movable to open and close a combined-fuel outlet passage to the plurality of nozzle outlets, and a check valve positioned at least partially in the first fuel passage.

In another aspect, a method of operating an engine system includes feeding a first fuel from a fuel pump into a fuel injector, and feeding a second fuel into the fuel injector. The method further includes injecting a first fuel charge pressurized in the fuel injector and containing the first fuel and the second fuel into a cylinder in an engine, and injecting a second fuel charge pressurized in the fuel injector and containing the first fuel into the cylinder in the engine. The method still further includes varying an output of the fuel pump to vary an amount of the first fuel in the second fuel charge relative to an amount of the first fuel in the first fuel charge.

In still another aspect, a fuel injector includes an injector housing with a nozzle having formed therein a plurality of nozzle outlets, a first fuel passage extending from a first fuel inlet, and a second fuel passage extending from a second fuel inlet. The fuel injector further includes a plunger movable in a plunger cavity fluidly connected to the second fuel passage, and a spill valve positioned fluidly between the plunger cavity and the second fuel inlet. The fuel injector further has formed therein a combined-fuel outlet passages, a nozzle check movable to open and close the combined-fuel outlet passage to the plurality of nozzle outlets, and a check valve positioned at least partially in the first fuel passage.

DETAILED DESCRIPTION

Figure 1:
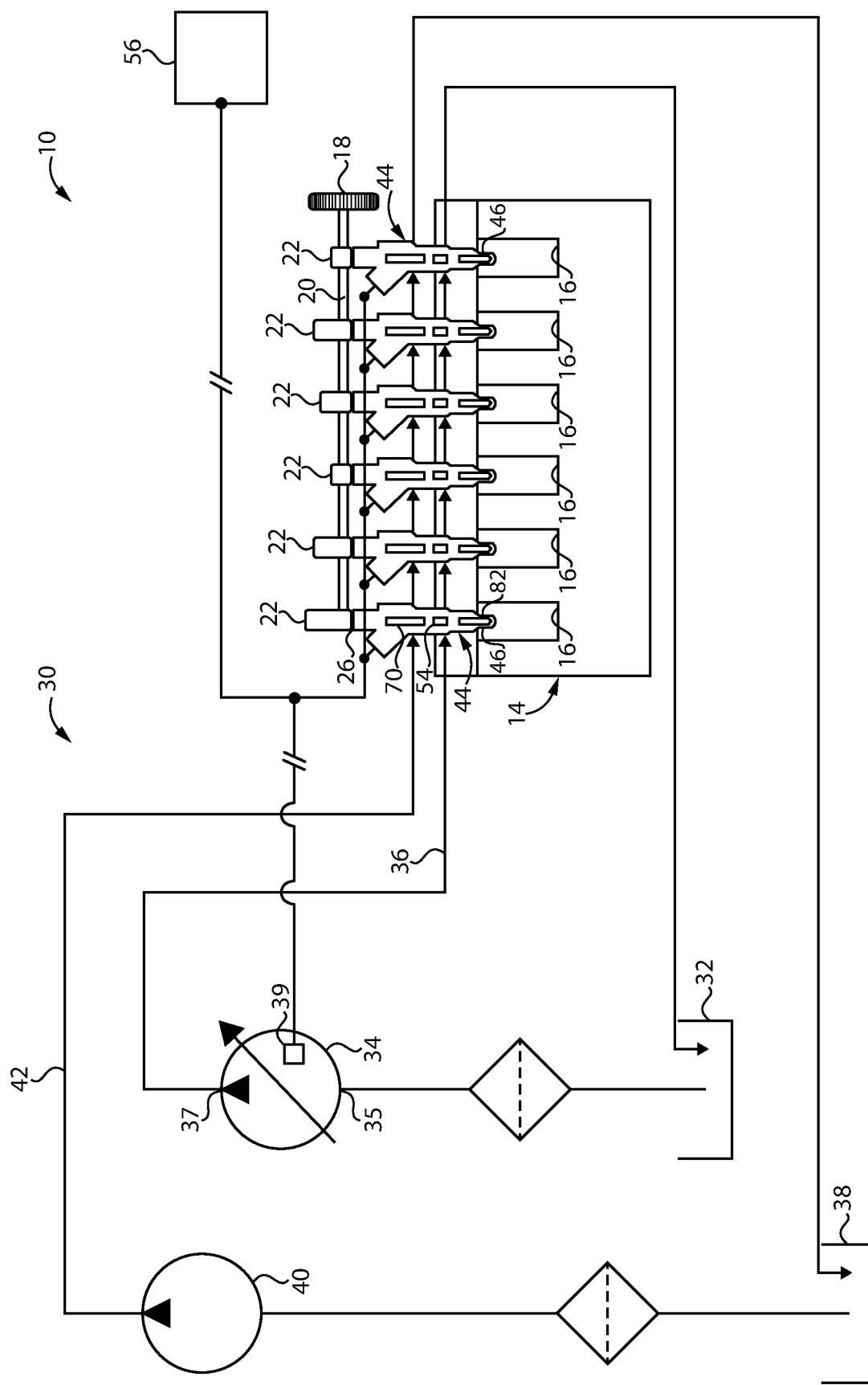
FIG. 1 is a diagrammatic view of a dual fuel engine system, according to one embodiment.

Referring to FIG. 1, there is shown a dual fuel internal combustion engine system 10, according to one embodiment. Engine system 10 includes a dual fuel engine 12 having an engine housing 14 with a plurality of combustion cylinders 16 formed therein. Engine housing 14 will typically include a cylinder block forming cylinders 16 and an engine head arranged in one or more engine head sections. Engine 12 may include any number of cylinders in any suitable arrangement, such as an inline pattern, a V-pattern, or still another. Engine 12 will also typically include a gear train having a cam gear 18. Cam gear 18 is rotatable to rotate a camshaft 20, typically at one-half engine speed. Camshaft 20 includes a plurality of cams 22 each having a cam lobe 24 and defining a base circle 26. Engine system 10 may be applied for electric power generation, vehicle propulsion such as in a land vehicle or a marine vessel, operation of a pump or a compressor, or in various other applications.

Engine system 10 further includes a dual fuel system 30 having a first fuel supply 32 of a first fuel, and a second fuel supply 38 of a second fuel. The first fuel may include a compression-ignition fuel, such as a diesel distillate fuel, or a lower cetane fuel blended with a cetane enhancer, for example. The second fuel may include a lower cetane fuel, and in a practical implementation includes an alcohol fuel such as methanol, or a methanol blend. Dual fuel system 30 further includes a pump 40 structured to pump the second fuel by way of a fuel supply conduit 32 to engine 12. Dual fuel system 30 also includes another pump 34 structured to pump the first fuel by way of a fuel supply conduit 36 to engine 12.

In a practical implementation, pump 34 includes a variable-output fuel pump, typically including a variable outlet-pressure fuel pump. To this end, pump 34 includes a pump inlet 35, a pump outlet 37, and at least one actuator 39 structured to adjust outlet metering or inlet metering of pump 34 to vary an output pressure of pumped fuel. Suitable inlet-metered pumps, outlet-metered pumps, or pumps variable in output by other mechanisms are well-known in the art. Dual fuel system 30 might be equipped with multiple pumps for the first fuel and/or multiple pumps for the second fuel in some embodiments. Dual fuel system 30 also includes a control system 56 including any suitable computerized electronic control unit structured to electronically control pump 34 and other electronically controlled equipment such as fuel injectors, according to generally well-known strategies and as further discussed herein.

Figure 2:
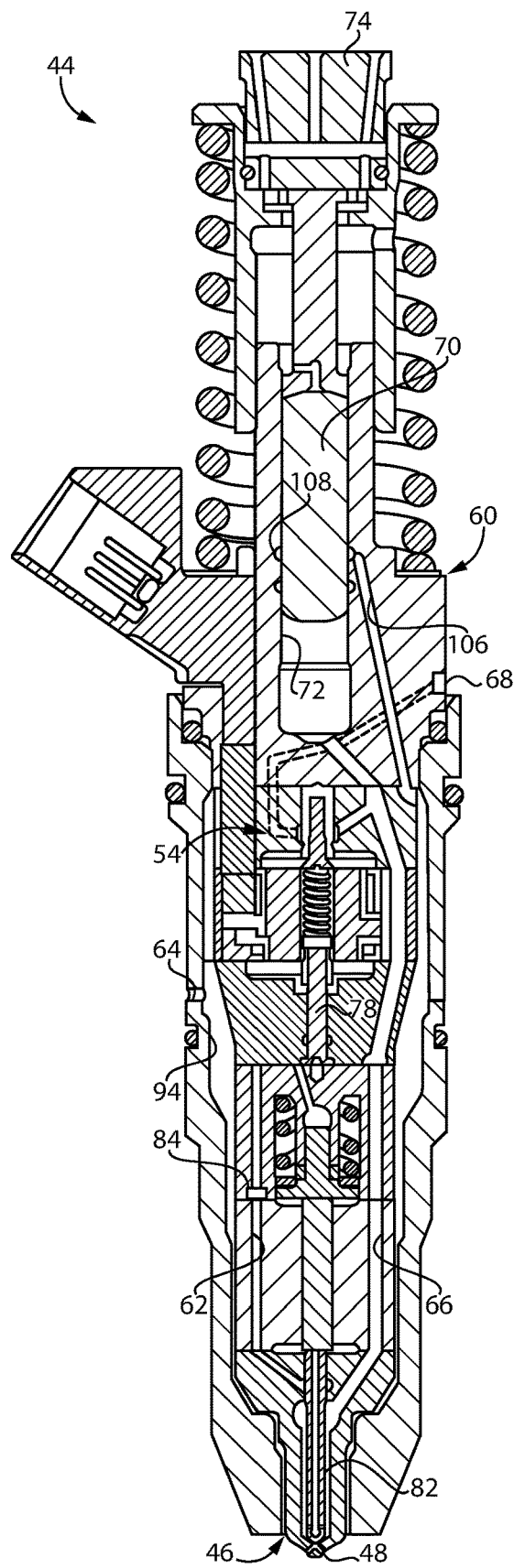
FIG. 2 is a sectioned side diagrammatic view of a fuel injector suitable for use in the engine system of FIG. 1.

Dual fuel system 30 further includes a plurality of fuel injectors 44. The plurality of fuel injectors 44, hereinafter referred to, at times, in the singular, are generally interchangeable with one another in engine system 10 and each include a nozzle 46 extending into a respective one of cylinders 16. Referring also now to FIG. 2, nozzle 46 has formed therein a plurality of nozzle outlets 48 each fluidly connected to the respective cylinder 16. Fuel injector 44 also includes an injector housing 60, forming a first fuel passage 62 for the first fuel extending from a first fuel inlet 64 fed by way of fuel supply conduit 36, and a second fuel passage 66 for the second fuel extending from a second fuel inlet 68 fed by way of fuel supply conduit 42.

Fuel injector 44 also includes a plunger 70 movable in a plunger cavity 72 fluidly connected to second fuel passage 66. Fuel injector 44 may also include a tappet 74 coupled to plunger 70 and movable in response to rotation of a respective one of cams 22. Fuel injector 44 also includes a valve assembly 54 including a spill valve 76 and an injection control valve 78. In the illustrated embodiment spill valve 76 and injection control valve 78 are operated by way of an electrical actuator assembly 80, including for example a solenoid actuator assembly of a generally known design. Spill valve 76 is positioned fluidly between plunger cavity 72 and second fuel inlet 68. Spill valve 76 is movable between an open position, at which reciprocation of plunger 70 draws fuel into plunger cavity 72 and expels fuel from plunger cavity 72 by way of second fuel outlet 68, and a closed position at which advancing of plunger 70 pressures one or both of the first fuel and the second fuel within fuel injector 44 to an injection pressure. Injection control valve 78 is movable to open and close a seat 86 or similar sealing surface to control a hydraulic pressure of the first fuel in a control chamber 88, again according to generally known principles. Fuel injector 44 also includes a nozzle check 82 movable, based at least in part upon a pressure prevailing in control chamber 88, to open and close nozzle outlets 48.

Figure 3:
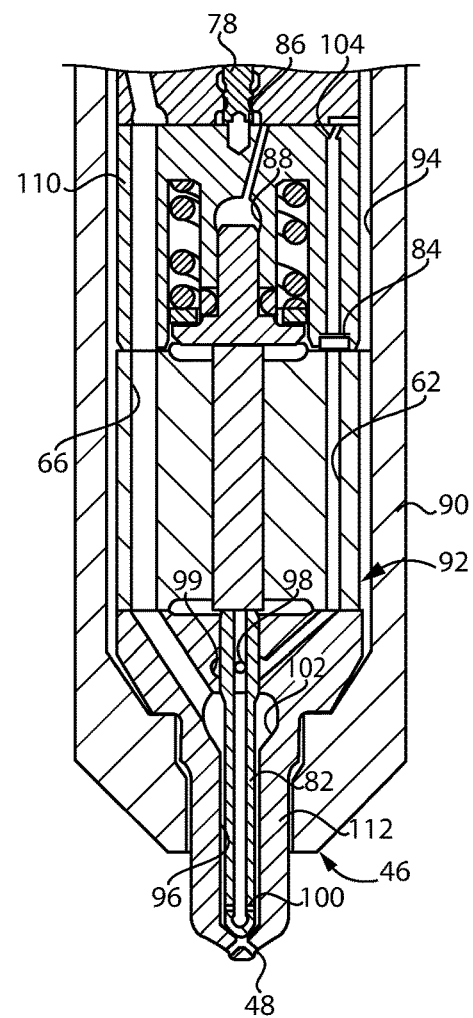
FIG. 3 is a sectioned side diagrammatic view through a portion of the fuel injector as in FIG. 2.

Focusing now on FIG. 3, injector housing 60 may include an injector case 90 and a stack 92 positioned at least partially in injector case 90. A low pressure space 94 may be defined between stack 92 and injector case 90 and is fluidly connected to fuel pump 34 and to first fuel inlet 64. Fuel injector 44 also includes a check valve 84 positioned at least partially in first fuel passage 62. In the illustrated embodiment, check valve 84 includes a check plate movable based upon fuel pressures in first fuel passage 62 between an open position, downward in the FIG. 3 illustration, and permitting flow of the first fuel from first fuel inlet 64 towards nozzle 46, and a closed position limiting backflow of fuel through first fuel passage 62 toward first fuel inlet 64. In other embodiments, a ball check might be used, or potentially an electrically actuated valve operable to check backflow of the first fuel.

Fuel injector 44 further has formed therein a combined-fuel outlet passage 96. Combined-fuel outlet passage 96 is configured to contain a combined fuel charge of the first fuel and the second fuel, a single fuel charge of the first fuel, or potentially also a single fuel charge of the second fuel. A fuel charge according to the present disclosure may be formed in combined-fuel outlet passage 96 in fuel injector 44, and pressurized to an injection pressure via operation of plunger 70, as further discussed herein.

In the illustrated embodiment, first fuel passage 62 extends through nozzle check 82. As shown, first fuel passage 62 may extend between a fuel feed opening 98 formed in nozzle check 82 and a plurality of transfer passages 100 formed in nozzle check 82 and opening to combined-fuel outlet passage 96. A fuel annulus 99 may extend circumferentially around nozzle check 82 and feeds the first fuel into nozzle check 82 at a plurality of locations of a plurality of fuel feed openings 98. Transfer passages 100 may extend generally radially outward from an approximate centerline of nozzle check 82 to fluidly connect directly to combine-fuel outlet passage 96 at a plurality of locations. As can also be seen from FIG. 3, a fuel cavity 102 may extend circumferentially around nozzle check 82 and fluidly connects between second fuel passage 66 and combined-fuel outlet passage 96. Transfer passages 100 may open to combined-fuel outlet passage 96 at a location that is fluidly between fuel cavity 102 and nozzle outlets 48. Fuel injector 44 may further include an orifice 104 that fluidly connects first fuel passage 62 to first fuel inlet 64, acting as a flow-restriction orifice. Check valve 84 may be positioned fluidly between flow-restriction orifice 104 and annulus 99.

Returning to FIG. 2, there can be seen another fuel passage 106 that connects fluidly between low pressure space 94 and a fuel annulus 108 extending circumferentially around plunger 70 such that fuel annulus 108 is provided a feed of the first fuel. Also in the illustrated embodiment, annulus 99 and fuel cavity 102 are formed in a tip piece 112 of stack 92. Another stack piece 110 forms control cavity 88 and orifice 104. In other embodiments at least some of these structures might be located in different pieces of stack 92. It can further be noted low pressure space 94 substantially surrounds stack 92 to permit flow of the first fuel into pressure control cavity 88 and through and around injection control valve 78.

INDUSTRIAL APPLICABILITY

Referring to the drawings generally, operating engine system 10 can include feeding the first fuel from pump 34 and feeding the second fuel from pump 40 into each of fuel injectors 44. Camshaft 20 is meanwhile rotating and contacting each of cam lobes 22 to tappets 74 to reciprocate plungers 70 in each fuel injector 44. The provision of the first fuel and the second fuel to each fuel injector 44 enables a fuel charge containing both the first fuel and the second fuel to be formed within combined-fuel outlet passage 62 in each fuel injector 44 in a dual fuel mode. In an implementation, a fuel charge in a dual fuel mode will include the first fuel leading and the second fuel trailing, meaning that the first fuel conveyed into combined-fuel outlet passage 96 from transfer passages 100 will reside just inside of tip piece 112 close to nozzle outlets 48, and the second fuel will fill cavities in fuel injector 44 fluidly connected to plunger cavity 72, including second fuel passage 66. A quantity of the first fuel may be relatively smaller, and a quantity of the second fuel relatively larger in dual fuel mode.

At an appropriate timing, spill valve 76 can be closed to permit pressure to build in plunger cavity 72. Injection control valve 78 can be opened at an appropriate timing to relieve pressure in control chamber 88 by fluidly connecting control chamber 88 to low pressure space 94, and permit the pressurized fuel in combined-fuel outlet passage to cause nozzle check 82 to lift, fluidly connecting nozzle outlets 48 to combined-fuel outlet passage 96 and injecting a first fuel charge containing the first fuel and the second fuel into a cylinder 16 in engine 12.

It may be desirable, at times, to vary a relative proportion of the first fuel in a fuel charge formed in fuel injector 44, including forming a fuel charge at times composed entirely of the first fuel in a so-called diesel-only mode. Certain earlier strategies encountered obstacles respecting metering a first fuel in a dual fuel injector to form a fuel charge of solely, or at least predominantly, the first fuel. In an engine system such as engine system 10, admitting the first fuel into the fuel injector so that it can reside momentarily quiescent in combined-fuel outlet passage 96 tends to require that the first fuel be admitted when plunger 70 is not advancing. As a result there can be a relatively short timing window within which the first fuel needs to be admitted. To accommodate a full load range of engine 12 in a diesel-only mode, it may be necessary to vary the admitted quantity of the first fuel significantly, creating challenges especially when a quantity of the first fuel sufficient for higher load operation is required.

According to the present disclosure, the first fuel may be fed into fuel injector 44, such as by operating pump 34, at a timing when tappet 74 is in contact with base circle 26, otherwise known as an off-cycle of the respective cam 22. An output of pump 34 may be varied to provide a varied amount of the first fuel depending upon engine load satisfaction requirements. Thus, an output of pump 34 may be varied between the injection of the first fuel charge and the injection of a second fuel charge. It will also be recalled that check valve 84 may operate to prevent backflow of the first fuel through first fuel passage 62 when plunger 70 is advanced to pressurize the second fuel charge containing the first fuel in an amount varied relative to an amount of the first fuel in the first fuel charge. As also noted, the second fuel charge could be solely formed of the first fuel, although in other embodiments the present strategy could be employed to vary an amount of the first fuel in a fuel charge containing both the first fuel and the second fuel.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel system comprising:
    a first fuel supply of a first fuel;
    a second fuel supply of a second fuel;
    a fuel injector including a nozzle having formed therein a plurality of nozzle outlets, a first fuel passage extending from a first fuel inlet for the first fuel, and a second fuel passage extending from a second fuel inlet for the second fuel; and
    the fuel injector further having formed therein a combined-fuel outlet passage, and including a nozzle check movable to open and close the combined-fuel outlet passage to the plurality of nozzle outlets, and a check valve positioned at least partially in the first fuel passage and movable between a first position permitting fuel flow to the combined-fuel outlet passage, and a second position preventing fuel backflow from the combined-fuel outlet passage.

2. The dual fuel system of claim 1 further comprising a variable-output fuel pump fluidly connected to the first fuel inlet.

3. The dual fuel system of claim 2 wherein the fuel injector further includes an injector case supported in the engine housing, and a stack within the injector case, and wherein a low pressure space is defined between the stack and the injector case and is fluidly connected to the variable-output fuel pump by way of the first fuel inlet.

4. The dual fuel system of claim 1 wherein the check valve is located fluidly between the combined-fuel outlet passage and the first fuel inlet.

5. The dual fuel system of claim 4 wherein the check valve includes a check plate.

6. The dual fuel system of claim 1 wherein the fuel injector further includes a plunger movable in a plunger cavity fluidly connected to the second fuel passage, and a spill valve positioned fluidly between the plunger cavity and the second fuel inlet.

7. The dual fuel system of claim 1 wherein the first fuel passage extends through the nozzle check.

8. The dual fuel system of claim 7 wherein the first fuel passage extends between a fuel feed opening formed in the nozzle check and a plurality of transfer passages formed in the nozzle check and opening to the combined-fuel outlet passage.

9. The dual fuel system of claim 8 wherein a fuel cavity extends circumferentially around the nozzle check and fluidly connects between the second fuel passage and the combined-fuel outlet passage, and the plurality of transfer passages open to the combined-fuel outlet passage at a location that is fluidly between the fuel cavity and the plurality of nozzle outlets.

10. A method of operating an engine system comprising:
    feeding a first fuel from a fuel pump into a fuel injector;
    feeding a second fuel into the fuel injector;
    injecting a first fuel charge pressurized in the fuel injector and containing the first fuel and the second fuel into a cylinder in an engine;
    injecting a second fuel charge pressurized in the fuel injector and containing the first fuel and the second fuel into the cylinder in the engine; and
    varying an output of the fuel pump to vary an amount of the first fuel in the second fuel charge relative to an amount of the first fuel in the first fuel charge.

11. The method of claim 10 further comprising forming the first fuel charge and forming the second fuel charge in a combined-fuel outlet passage in the fuel injector.

12. The method of claim 11 wherein the forming the first fuel charge includes forming the first fuel charge with the first fuel leading and the second fuel trailing.

13. The method of claim 12 wherein the first fuel includes a compression-ignition fuel and the second fuel includes an alcohol fuel.

14. The method of claim 11 wherein the forming the first fuel charge and the forming the second fuel charge each include feeding the first fuel through a nozzle check of the fuel injector to the combined-fuel outlet passage.

15. The method of claim 11 wherein the feeding the first fuel includes feeding the first fuel through a flow restriction orifice, and further comprising limiting backflow of the first fuel during pressurizing the first fuel charge and during pressurizing the second fuel charge via a check valve positioned fluidly between the flow restriction orifice and the combined-fuel outlet passage.

16. The method of claim 10 wherein the feeding the first fuel into the fuel injector occurs during an off-cycle of a cam coupled to a plunger in the fuel injector.

17. A fuel injector comprising:
    an injector housing including a nozzle having formed therein a plurality of nozzle outlets, a first fuel passage extending from a first fuel inlet, and a second fuel passage extending from a second fuel inlet;

a plunger movable in a plunger cavity fluidly connected to the second fuel passage;

a spill valve positioned fluidly between the plunger cavity and the second fuel inlet; and the fuel injector further having formed therein a combined-fuel outlet passage, a nozzle check movable to open and close the combined-fuel outlet passage to the plurality of nozzle outlets, and a check valve separate from the nozzle check and positioned at least partially in the first fuel passage.

18. The fuel injector of claim 17 wherein the first fuel passage extends through the nozzle check.

19. The fuel injector of claim 18 wherein the check valve includes a check plate.

20. The fuel injector of claim 18 wherein:

the first fuel passage extends between a fuel feed opening formed in the nozzle check and a plurality of transfer passages formed in the nozzle check and opening to the combined-fuel outlet passage; and a fuel cavity extends circumferentially around the nozzle check and fluidly connects between the second fuel passage and the combined-fuel outlet passage; and the plurality of transfer passages open to the combined-fuel outlet passage at a location that is fluidly between the fuel cavity and the plurality of nozzle outlets.

* * * * *